United States Patent [11] 3,624,288

[72] Inventor Judson A. Hofmann
Oak Park, Ill.
[21] Appl. No. 873,757
[22] Filed Nov. 5, 1969
[45] Patented Nov. 30, 1971
[73] Assignee Zenith Radio Corporation
Chicago, Ill.

[54] VIDEO SIGNAL NOISE ELIMINATION CIRCUIT

15 Claims, 3 Drawing Figs.

[52] U.S. Cl. .......... 178/7.3 R, 178/DIG. 12, 178/7.3 S, 178/7.5 S, 307/237, 325/479, 328/165
[51] Int. Cl. .......... H04n 3/16
[50] Field of Search .......... 178/DIG. 12, 7.3 S, 7.5 S, 7.3 R; 325/475, 476, 479; 328/162, 165, 58; 307/267, 237; 330/149

[56] References Cited

UNITED STATES PATENTS 3,322,968 5/1967 Dennis .......... 328/165
3,366,884 1/1968 Kurusw .......... 325/478
3,453,386 7/1969 Hofmann .......... 178/6 NS

*Primary Examiner*—Robert L. Griffin
*Assistant Examiner*—Doanld E. Stout
*Attorneys*—James E. Tracy and Francis W. Crotty

ABSTRACT: Noise components in a composite video signal are completely removed by modifying that signal with protection pulses each of which effectively anticipates and embraces an assigned respective one of the noise components. This is achieved by stretching the output pulses of a threshold-biased noise separator to form the protection pulses which are then combined with the composite video signal, but after it has been delayed in a delay network, to cancel the noise components. The sync components may then be separated from the noise-free video signal. A keyed automatic gain control system for the television receiver may also be noise gated by the protection pulses.

(Prior Art Operation)

Inventor
Judson A. Hofmann
By [signature]
Attorney

Inventor
Judson A. Hofmann
By James E. Tracy
Attorney

VIDEO SIGNAL NOISE ELIMINATION CIRCUIT

BACKGROUND OF THE INVENTION

This invention pertains to a novel noise protection arrangement for minimizing deleterious effects on the operation of a television receiver usually resulting from undesired noise components in a composite video signal. More particularly, the invention immunizes the sync separation and/or automatic gain control processes against unwanted noise interference.

A variety of noise protection circuits have been developed for suppressing extraneous noise components in a composite video signal before the sync components are segregated from that signal. Other protection schemes produce, from the noise components, gating pulses for disabling or locking off the sync separator and the automatic gain control (AGC) system in the presence of noise. While many of these prior noise-immunizing arrangements do substantially reduce the influence of noise components on the operation of a television receiver, they are far from 100 percent effective and thus do not provide complete immunity against noise. The shortcomings and disadvantages of prior noise protection circuits may most easily be understood by referring to the idealized signal waveforms of FIG. 1 which are typical of those found in television receivers employing the most sophisticated and effective noise protection circuits devised heretofore.

Curve A depicts the voltage waveform of a typical composite video signal as it may appear at the output of the video detector of a television receiver. It contains desired video components 11 during its horizontal trace intervals and desired horizontal synchronizing components 12 and blanking components 13 during its horizontal retrace intervals. For convenience, waveform A illustrates a composite video signal derived or detected from a received television signal representing a program transmitted in black and white or monochrome. Hence, video components 11 vary within an amplitude range between and defined by a white level, representing white picture information and conveyed by the minimum peak-to-peak carrier amplitude, and a black level representing black picture information and which is the same as the level of the blanking pedestals 13. The sync components 12 (conveyed by the maximum peak-to-peak carrier amplitude) extend into the so-called blacker-than-black region to a peak amplitude referred to as the sync tip level. These various amplitude levels are indicated by dashed construction lines in curve A.

It is assumed that the receiver is properly gain controlled in accordance with the incoming signal strength, and thus the curve A signal will have the desired peak-to-peak amplitude required to appropriately control the receiver's picture tube. The AGC system, even in the presence of variations of the signal strength of the received television signal, operates to effectively maintain a fixed relationship between the sync tip level and an AGC reference or threshold level. Preferably, in a high-gain AGC system the sync tips will be held to the AGC reference level and will not vary significantly therefrom as the strength of the television signal, picked up at the antenna, varies.

With the particular polarity shown for curve A, namely with negative-going sync pulses and with the maximum positive potential representing white picture information, a video detector may be constructed so that the entire amplitude range between the sync tip and white levels is positive with respect to the ground or zero-voltage level in the receiver, as is also the case depicted by waveform A as evidenced by the lowermost dashed construction line.

Two undesired noise components, labeled by the reference numerals 16 and 17, are included in the composite video signal of curve A. These components are impulse as distinguished from thermal noise components. Each of the components 16, 17 extends with decreasing width (namely with finite rise and fall times) in the direction of sync components 12 and to a peak amplitude substantially beyond the sync tip level. Since impulse noise component 16 occurs within trace X only video information is lost. Component 17, on the other hand, overlaps retrace Z and therefore masks or camouflages the sync component normally occurring during that retrace interval.

In the absence of any noise cancellation or gating whatsoever, impulse noise components 16 and 17 would have a devastating and paralyzing effect on the operation of both the sync separator and AGC system. With noise cancellation or noise gating, as practiced in the prior art, their effects are reduced considerably but not entirely. In accordance with one widely used approach, a degree of immunity against noise has been achieved for the sync separation function by employing an amplitude-sensitive noise separator for producing, in response to the portion of each noise component which extends beyond a noise threshold level, a noise cancellation pulse which is then effectively subtracted from the noise component to depress a major portion of it well into the amplitude range covered by the video components and preferably down to a level close to white level. The noise threshold level indicated by a dashed construction line in waveform A is typical. It lies in the superblack region and outside of the amplitude range over which the desired video and sync components vary.

Voltage waveform B illustrates the noise cancellation pulses produced by such a noise separator, pulse 18 in that waveform having a duration equal to the width of noise component 16 at the threshold level and pulse 19 having a width equal to that of component !17 at the noise threshold. Noise cancellation by means of pulses 18 and 19 results in the composite video signal shown by waveform C. During the duration of each cancellation pulse the video signal of curve C is established at or clamped to a fixed amplitude level. Since a sync separator is customarily biased to strip off or separate from the applied video signal only those components that exceed the nominal sync clipping level indicated by dashed construction lines in waveforms A and C, the pulses shown by voltage waveform D will be developed in the output of the separator. The desired sync components 12 occurring during retraces X and Y are included in curve D, but the other pulses in that waveform are extraneous and result from the fact that leading and trailing portions or edges of each noise component 16, 17 cannot be suppressed in the curve C video signal and have peak amplitudes that exceed the sync clipping level. Specifically, the leading and trailing portions of noise component 16 that remain in waveform C manifest in unwanted pulses 21, 22 respectively in the output signal of the separator, while the two portions of component 17 in curve C result in spurious output pulses 23 and 24. The operation of the receiver's horizontal sweep system, which is controlled by the pulses of curve D, will be upset and thrown out of synchronism due to the presence of extraneous pulses 21–24, and this is true even though an automatic frequency or phase control arrangement may be used in conjunction with the oscillator in the sweep system.

In another widely used noise protection circuit for a sync separator, noise components are not deleted from the composite video signal prior to its application to the separator but instead the output pulses (waveform B) of the noise separator are utilized as noise gating pulses to disable the sync separator during the occurrence of each such pulse. However, since each of those B-pulses is narrower than the width of its associated noise component at the sync clipping level, the signal of curve D would still appear in the sync separator output.

Prior noise protection arrangements for the AGC systems of television receivers have failed to provide total immunity against the disruptive effects of impulse noise components occurring during retrace intervals. To explain, a conventional AGC voltage generator comprises a peak detector of one form or another having a clamp capacitor which is charged, when the strength of the television signal received at the antenna either increases or remains constant, during each horizontal retrace interval to an extent determined by the peak amplitude of the sync component during that interval. The clamp capacitor discharges slightly during each horizontal trace interval. The magnitude of the capacitor voltage, suitably filtered, provides an AGC voltage. Slight charging of the clamp capacitor is necessary during periods of constant signal strength to replenish or replace the charge lost during the trace intervals. As is the case in any negative feedback system, a small error signal must always be present in order to maintain the status quo.

When the strength of the incoming television signal increases, the peak-to-peak amplitude of the composite video signal developed in the video detector output increases but the AGC voltage generator, in response to the greater peak amplitude of the sync pulses, supplies more charging current to the clamp capacitor to increase the AGC voltage. This in turn causes a reduction in gain of the receiver in the amount necessary to decrease the peak-to-peak amplitude of the composite video signal to that required. On the other hand, when the signal strength decreases no charging current flows to the capacitor and it is permitted to discharge to a voltage appropriate to increase the gain to the degree essential to bring the composite video signal back up to the required peak-to-peak amplitude. Automatic control of the charging current translated to the clamp capacitor during retrace interval is generally obtained by means of a normally cutoff gated amplifying device or AGC gate to the control element of which is applied the composite video signal and which is enabled by applied horizontal retrace or flyback voltage pulses received from the horizontal sweep output transformer. The AGC gate is threshold biased to conduct, and therefore sample, only those sync components whose peak amplitudes reach the AGC reference level thereby producing output current pulses (to serve as the charging current for the capacitor) of peak amplitudes determined by the peak amplitudes of the sync components. The greater the peak amplitude of the sync components the greater will be the charging current translated through the AGC gated amplifier to the clamp capacitor and the greater will be the magnitude of the AGC voltage.

The charging current supplied to the clamp capacitor is shown by current waveform E in FIG. 1. Since the output signal of the video detector has the required peak-to-peak amplitude, only the relatively small current pulses 26 are delivered by the AGC gate to the capacitor during retraces X and Y to replace the charge lost between retrace intervals and to maintain a constant gain in the receiver. When the AGC gate is keyed on or enabled during those two retrace intervals, the sync peaks sampled effectively indicate that no gain change is in order.

Partial immunity of such a conventional AGC system to impulse noise has been achieved by using the output pulses (curve B) of the noise separator to noise gate the AGC voltage generator thereby disabling it during the occurrence of each such pulse. Unfortunately, due to the fact that each of the B-pulses is narrower than the width of its associated noise component at the AGC reference level, disabling of the AGC system only during the durations of pulses 18 and 19 provides immunity to only those parts of the noise pulses occurring during the intervals covered by the B-pulses. In the case of retrace Z, cancellation of noise component 17 does not begin until its amplitude reaches the noise threshold level, by which time the AGC reference level has already been crossed and the AGC gate has been driven to maximum conduction. To elucidate, as illustrated in curves A and C, the leading portion or edge of component 17 extends above the AGC threshold level and a sampling thereof would misrepresent the true strength of the television signal. Unfortunately, since the AGC gated amplifier will be enabled by a horizontal retrace pulse during the occurrence of that leading edge a grossly incorrect sample will be taken, causing a substantial amount of charging current (as indicated by current pulse 27) to be translated through the AGC gate to the clamp capacitor to effect an immediate and substantial increase of the AGC voltage and a resulting gain reduction to the extent that the picture tube will no longer reproduce an image. Oftentimes the undesired charging current is so high that the AGC system becomes paralyzed and a considerable period of time must elapse, long after the termination of the noise pulse, before the capacitor can discharge sufficiently to accurately reflect the true signal strength and establish the appropriate gain in the receiver.

The present invention constitutes a significant and major advancement over all previously developed noise protection arrangements since it is capable of attaining a considerably greater degree of immunity of both the sync separation and AGC operations against deleterious effects of impulse noise components such as those appearing in waveform A. With applicant's invention, only sync components 12 of waveform D would be developed in the output of the sync separator in response to the composite video signal of curve A. Moreover, the AGC system would respond only to the sync pulses occurring during retraces X and Y and produce the desired current pulses 26; no unwanted and damaging current pulse, like pulse 27, would be created during retrace interval Z.

Accordingly, it is an object of the present invention to provide a new and improved noise protection arrangement for substantially enhancing the noise immunity of at least the sync separation and/or AGC functions of a television receiver.

It is another object of the invention to provide a novel noise protection circuit for minimizing deleterious effects of impulse noise on the overall operation of a television receiver.

It is a further object to provide a unique video signal noise elimination circuit.

Another goal of the invention is to provide a novel generator for producing noise protection pulses suitable for, among other things, immunizing the sync separator and/or the AGC system of a receiver against noise.

An additional object is to provide a noise protection circuit that leads itself readily to circuit integration and may easily be reduced to a monolithic structure.

SUMMARY OF THE INVENTION

A noise protection arrangement, constructed in accordance with the invention, for a television receiver comprises means for deriving, from a received television signal, a composite video signal having desired video and sync components varying within a predetermined amplitude range between and defined by sync tip and white levels, but subject to the introduction of undesired noise components each extending with decreasing width in the direction of the sync components and to a peak amplitude beyond both the sync tip level and a predetermined noise threshold level lying outside of the range. Control means are provided for producing in response to each noise component a noise protection pulse of a duration greater than the width of the associated noise component at the noise threshold level. There are also immunizing means responsive to the noise protection pulses for minimizing deleterious effects of the noise components on the operation of the television receiver.

In accordance with one application of the invention, the duration of each noise protection pulse is made greater than the maximum width of its associated noise component, and the protection pulses are then employed to modify the composite video signal to delete therefrom the entirety of each noise component and develop a resultant composite video signal devoid of any noise contamination both above and below the noise threshold level.

According to a further variation of the invention, the noise protection pulses are utilized to effectively render the sync separator and/or the AGC system of the television receiver immune to the noise components.

DESCRIPTION OF THE DRAWINGS ILLUSTRATING THE INVENTION

The features of the invention which are believed to be novel are set forth with particularity in the appended claims. The invention, together with further objects and advantages thereof, may best be understood, however, by reference to the following description in conjunction with those drawings containing FIGS. 2 and 3. More particularly, FIG. 2 is a schematic diagram of a portion of a television receiver having a noise protection circuit constructed in accordance with one embodiment of the invention, and FIG. 3 depicts various idealized signal waveforms helpful in explaining the operation of the disclosure of FIG. 2. Curves A–L in FIG. 3 represent voltage signals which appear at various points in the illustrated noise protection arrangement as indicated by the corresponding encircled letters in FIG. 2. Curve M is a current signal waveform.

DESCRIPTION OF THE ILLUSTRATED EMBODIMENT

Figure 1:
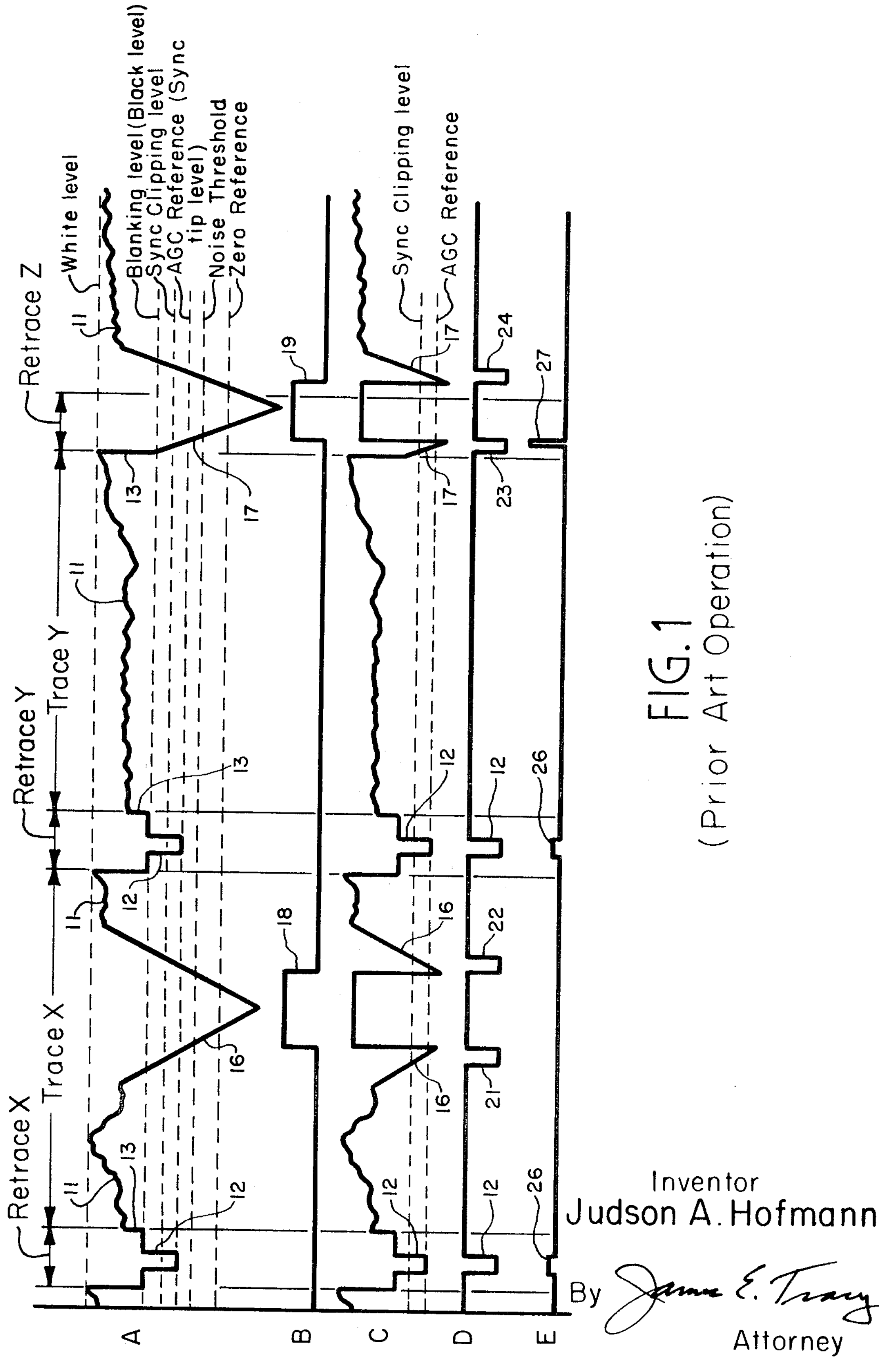
Figure 2:
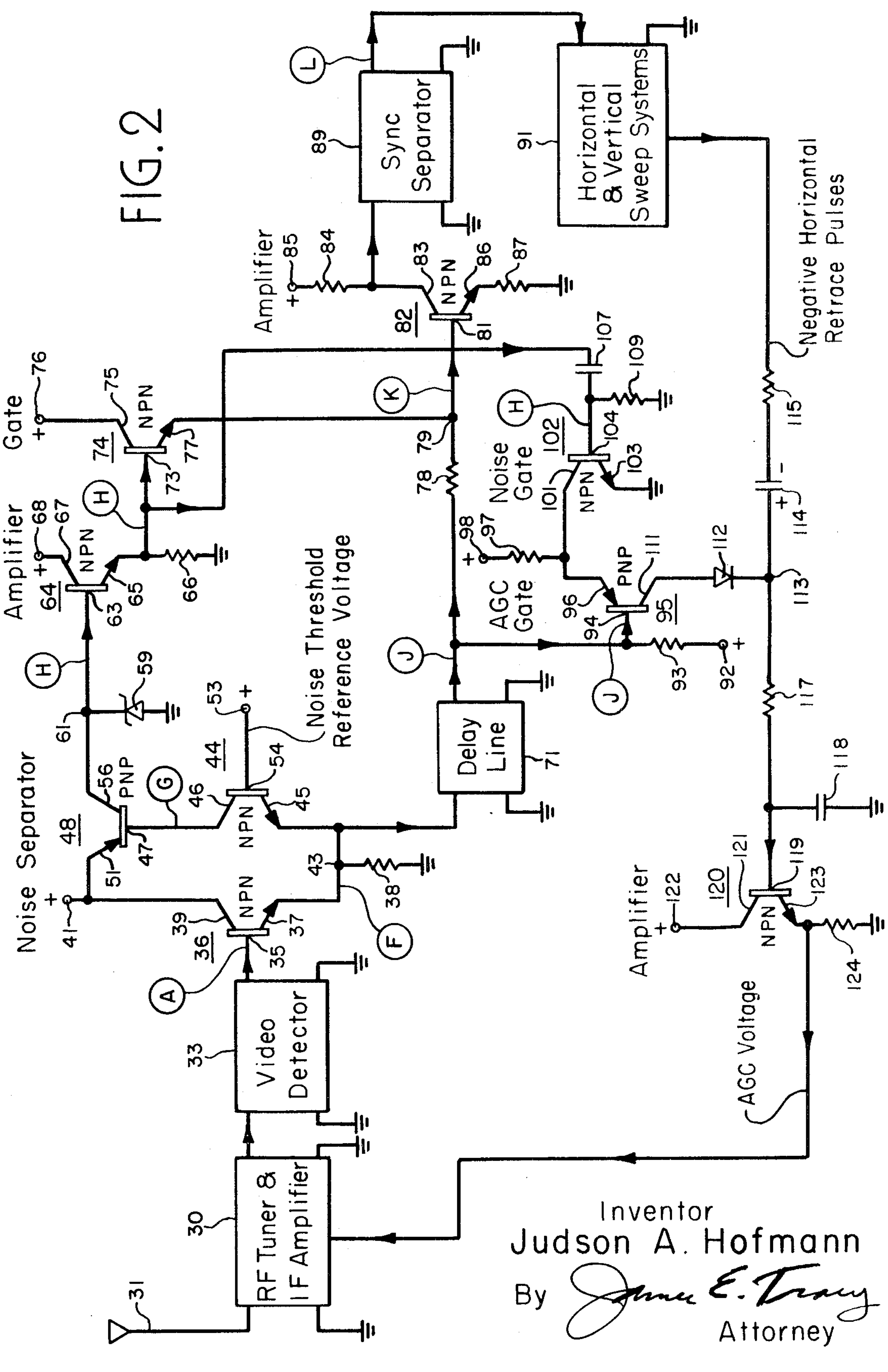
Figure 3:
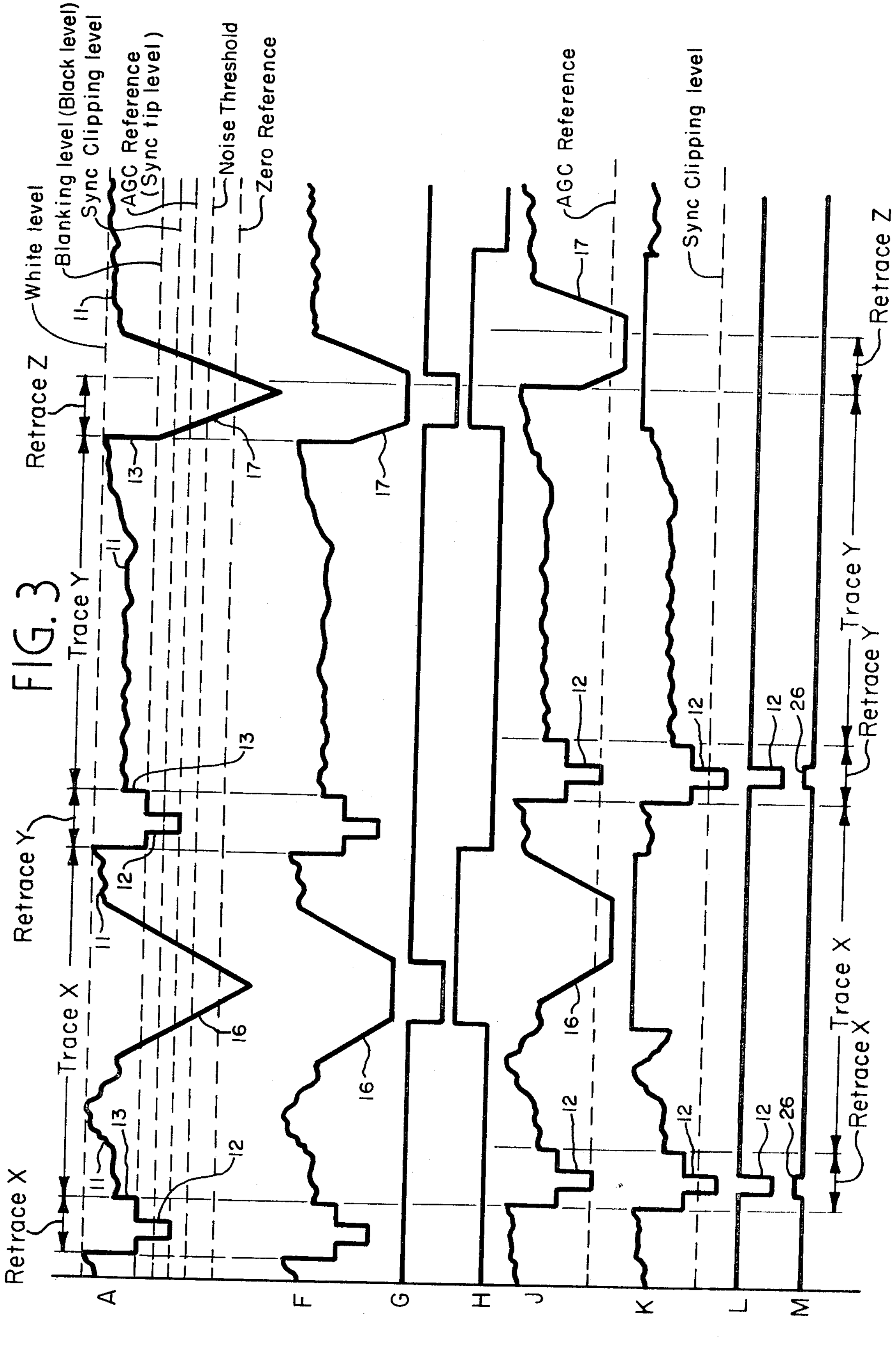

Turning now to the circuit diagram of FIG. 2, block 30 represents a conventional RF (or radiofrequency) tuner, of the superheterodyne type, and an IF (or intermediate frequency) amplifier. A television signal received at the antenna 31 is converted to an IF signal which is then amplified in one or more IF amplifying stages. The amplified IF signal developed at the output of block 30 is supplied to a video detector 33 which detects the composite video signal conveyed by the modulation components of the IF signal. In order to demonstrate most dramatically the merits of the present invention over the prior noise protection circuits, it is assumed that the waveform of the composite video signal derived by detector 33 is identical to that shown by waveform A in FIG. 1. To ease the explanation of the invention, waveform A has been repeated as the first curve in FIG. 3. It will also be noted that the various levels indicated by dashed construction lines in curve A of FIG. 3 are at the same amplitudes as in FIG. 1.

The video signal of waveform A is applied to the base 35 of a transistor 36 of NPN gender and whose emitter 37 is connected to ground through a resistor 38. The collector 39 is directly connected to a source of positive DC operating potential, schematically shown merely by a positive-marked terminal 41. With respect to at least the video and sync components of curve A, transistor 36 in conjunction with resistor 38 and potential source 41 constitutes a class A operated emitter follower to develop at emitter 37 the noise-clipped video signal of waveform F. The manner in which noise limiting or clipping takes place will be explained.

A normally cutoff NPN-transistor 44 has its emitter 45 connected to the circuit junction 43 of emitter 37 and resistor 38 and its collector 46 connected to the base 47 of a normally cutoff PNP-transistor 48 whose emitter 51 is connected to positive DC source 41. Transistors 44 and 48 are maintained in their cutoff conditions by means of positive DC potential source 53 which applies a reverse bias to base 54. The absence of collector current in transistor 44 prevents conduction in transistor 48. Since the composite video signal appears at junction 43, and is therefore applied to emitter 45, transistor 44 becomes forward biased and is rendered conductive anytime the instantaneous amplitude of the curve F video signal is negative with respect to (specifically less positive than) the voltage of DC source 53. When transistor 44 does conduct, its collector current flows through the base-emitter junction of transistor 48 to turn that transistor ON. The magnitude of source 53 is selected so that the base-emitter junction of transistor 44 remains reverse biased until the instantaneous amplitude of the video signal of curve A reaches the indicated noise threshold level. As shown in FIG. 2, the DC voltage applied to base 54 is appropriately called the "noise threshold reference voltage" as it established or sets the level that a noise component must reach before the noise protection circuitry goes into operation. Once transistor 44 becomes forward biased, it remains conductive (to in turn maintain transistor 48 conductive) as long as the instantaneous amplitude of the noise component exceeds the noise threshold level. Since each of noise components 16, 17 decreases in width as it extends to its peak amplitude, its duration at the noise threshold level is less than its maximum width. Transistors 44 and 48 thus conduct for only a part of the interval covered by each impulse noise component.

The peak amplitude of each noise component may be sufficient to drive transistor 44 into maximum conduction but this will not affect the operation of the noise protection circuit. Regardless of the amount of collector current flowing in transistor 44, so long as that transistor is operative junction 43 is essentially clamped to a fixed potential which would specifically be equal to the magnitude of source 53 minus the voltage drop across the base-emitter junction of transistor 44. A characteristic of a transistor is that its base-emitter voltage drop will be substantially constant regardless of the amount of base current. As a consequence, noise components 16 and 17 are clipped as they appear in the video signal of curve F. It is to be noted that the combination of transistors 36 and 44 and their associated elements actually constitute a differential amplifier. Once the voltage at base 35 drops to and crosses the noise threshold level in response to the leading edge of a noise component, causing the potential at junction 43 to drop to the level required to turn transistors 44 and 48 ON, transistor 36 may thereafter be cut off by the noise component but transistors 44 and 48 will continue to conduct until the component's trailing edge crosses the noise threshold level.

During the conduction intervals of transistors 44 and 48 the voltage at collector 46 drops (namely becomes less positive) with the result that the negative-going voltage pulses shown in waveform G are developed at that collector. It is apparent that the differential amplifier functions as an amplitude-sensitive noise separator for producing, in response to the relatively narrow portion of each noise component 16, 17 which extends beyond the noise threshold level, a G pulse (which for convenience may be termed a "noise control pulse") of a duration equal to the width of the associated noise component at the noise threshold level.

A positive-going voltage pulse is created at collector 56 each time transistor 48 conducts and it will have a magnitude sufficient to break down zener diode 59 connected between collector 56 and ground. As is characteristic of zener diodes, diode 59 presents a high-impedance load to collector 56 (to maximize the rise time of each voltage pulse developed at junction 61) until it breaks down, at which time it constitutes a low impedance load and provides at circuit junction 61 a positive-going pulse of a predetermined precise and regulated amplitude. In this way, any variations in the operating conditions of the noise separator (for example, due to a slight change of the magnitude of source 41) will not affect or alter the amplitude of the pulses developed at junction 61 because of the voltage regulation effectively introduced by zener diode 59.

The charge stored in the base-collector junction of transistor 48 prevents that device from turning OFF immediately subsequent to the termination or trailing edge of each noise control pulse of curve G. AS a consequence, the precise duration of each positive-going pulse developed at junction 61, and shown in voltage waveform H, is determined by the rate at which the charge is drained through zener diode 59 and transistor 64. By purposely retarding or delaying the turning off process of devices 48 and 59, those devices effectively provide a waveshaping circuit for stretching or elongating each of the curve G control pulses. By an appropriate choice of parameters, each of the stretched pulses of curve H may be given a duration slightly greater than the maximum width of its associated noise component. This may be observed by comparing curves A and H. It will be seen that the H-pulses are employed to achieve total protection or immunization of the sync separation and AGC processes against noise components 16 and 17. Those H pulses may therefore appropriately be called "noise protection pulses."

The protection pulses of curve H are applied to the base 63 of an NPN-transistor 64 whose emitter 65 is connected through a resistor 66 to ground, its collector 67 being connected to a positive DC potential source 68. As so connected, transistor 64 and its associated elements form an emitter follower to provide current amplification for, and a low-impedance source of, the noise protection pulses of curve H in order that subsequent stages, to be discussed, may be driven and controlled by the protection pulses. Waveform H also, of course, illustrates the wave shape of the output voltage developed at emitter 65.

The functions to be served by the noise protection pulses will be explained shortly, but first it is necessary to describe delay line 71 and the reason it is incorporated in the noise protection circuitry. Preferably, time delay network 71 is constructed only of resistors and capacitors so that it may easily be reduced to an integrated circuit, which could also contain most if not all of the circuit elements shown in detail in FIG. 2. It will be recognized that no inductance coils are required and thus all of the elements illustrated are readily susceptible to integration.

The input of RC delay line 71 is connected to junction 43 to delay the composite video signal of waveform F to the extent necessary to provide the delayed video signal of curve J at the output of the delay line. The specific amount of time delay imparted to the curve F signal will be determined by the maximum time duration that will ever probably occur between the very beginning of a noise component and the instant its leading edge crosses the noise threshold level. It has been found that a time delay of 400 nanoseconds is very satisfactory. By constructing devices 48 and 59 to stretch each G-pulse for a time interval equal to at least the time delay introduced by delay network 71, each of the noise protection pulses of curve H may be made to effectively anticipate and embrace its associated noise component in the delayed video signal, as may be seen by comparing waveforms H and J. Such a comparison clearly shows that each H-pulse starts prior to the commencement of its associated noise component in waveform J and does not end until after the noise pulse terminates.

Actually, it is not essential that each nose protection pulse be as wide as the maximum width of its associated NPN-transistor corresponding noise component. Greater noise immunity, than that attained by the prior art, is achieved merely by giving each protection pulse a width greater than that of its corresponding noise component as measured at the noise threshold level. As will be made apparent, complete noise immunity of both the sync separation and AGC processes may be accomplished by protection pulses of durations only slightly greater than the widths of the associated noise components as measured at the sync clipping level. In other words, each noise protection pulse need only embrace that portion of its corresponding noise component which reaches and exceeds the sync clipping level. By the same token, it will be obvious that each protection resistor need only be as wide as its associated noise component NPN-transistor measured at the AGC reference level to achieve total immunity in the AGC system.

Returning to the disclosed embodiment, the noise protection pulses of curve H are combined with, and modify, the delayed video signal to delete therefrom the entirety of the noise components 16, 17 and develop a resultant composite video signal devoid of any noise contamination both above and below the noise threshold level. The H-pulses effectively operate on the video signal to establish it at a fixed desired amplitude level throughout the entire duration of each noise component.

To explain, emitter 65 of transistor 64 is connected to the base 73 of a normally cutoff NPN-transistor 74, the collector 75 of which is directly connected to a positive source of DC potential 76 while its emitter 77 is connected to one terminal of a matrix impedance in the form of a resistor 78, the other terminal of the resistor being connected to the ungrounded output terminal of delay network 71. The circuit junction 79 of emitter 77 and resistor 78 is connected to the base 81 of an NPN-transistor 82, the collector 83 being connected through a resistor 84 to a positive source of DC operating potential 85 and the emitter 86 being connected via a resistor 87 to ground. Collector 83 is coupled to the input of a conventional sync separator 89 of the output of which is coupled to the horizontal and vertical sweep of deflection systems, schematically shown merely by the single block 91. Transistor 82 and its associated elements constitute a class A operated amplifier and provides buffering (or impedance matching) and polarity inversion.

The operation of the video signal processing circuitry will initially be described in the absence of impulse noise components and without reference to the waveforms of FIG. 3. When no noise pulses are present in the composite video signal developed by the video detector, that signal is translated through delay line 71 and resistor 78 to the input of transistor 82 wherein it is amplified for application to separator 89. In conventional fashion, the sync separator is threshold biased to respond to the applied composite video signal when its instantaneous amplitude reaches the nominal sync clipping level. The horizontal and vertical sync components are therefore stripped from the composite video signal in separator 89 and the separated sync pulses are then delivered to the sweep systems to properly control and synchronize the beam deflection process in the receiver's picture tube. The input impedance of transistor 82 is very high compared to the resistance of resistor 78. For that reason there will be a negligible voltage drop across resistor 78 for the desired video and sync components. Hence, those desired components experience no significant attenuation in translating through resistor 78 to base 81 when no noise is present.

Consideration will now be given to the operation of the video signal processing circuitry in response to the impulse noise components 16, 17. In effect, each of those components is cancelled from the delayed video signal (curve J) by supplying to the right terminal of resistor 78 cancellation pulses of a polarity opposite to that of the noise components applied to the left terminal of that resistor.

More particularly, the circuit is arranged so that the entire amplitude range covered by the video signal of curve J is sufficiently positive with respect to ground that current will flow only in the direction from the ungrounded output terminal of delay line 71 and through resistor 78, the base-emitter junction of transistor 82 and resistor 87 to ground, as is essential to maintain transistor 82 in its class A operating mode. Normally cutoff transistor 74 is gated or turned ON in response to each of the positive-going H-pulses with the result that its emitter current flows in the direction from emitter 77 to junction 79 and then divides into the two paths provided by the input of transistor 82 and matrix impedance 78. Actually, due to the high input impedance of transistor 82 essentially all of the emitter current from transistor 74 will flow into the right terminal of resistor 78. While the net current through resistor 78 will always be in the direction from delay line 71 to junction 79 and base 81, the current supplied by transistor 74 to that resistor will buck or partially cancel some of the current delivered by the delay line. In this way, a positive-going pulse is effectively added to each of the negative-going noise pulses 16, 17 as the composite video signal of waveform J is translated to base 81. In other words, to the left terminal of impedance 78 is supplied the delayed video signal with its noise components being of one polarity, and to the right terminal is supplied the noise protection pulses with opposite polarity. As shown by the resultant composite video signal of voltage waveform K, which appears at junction 79 and is applied to base 81, each of noise components 16, 17 has been removed in its entirety and the delayed video signal has been depressed to a fixed desired amplitude level which is preferably relatively close to the white level. The specific amplitude at which the video signal of curve K is established in response to and during the occurrence of the H-pulses is determined by the amplitude of the H-pulses at base 73, since junction 79 will be clamped to that base voltage minus the base-emitter voltage drop of transistor 74. The particular amplitude of the H-pulses as they are applied to base 63, of course, determine the base voltage applied to transistor 74. For that reason, zener diode 59 is desirable as it ensures that the H-pulses appearing at base 73 will have a uniform regulated amplitude so that the curve K video signal will always be established at the same level during the occurrence of noise.

Thus, by stretching the noise control pulses of curve G, each of which is only as wide as the relatively narrow portion of its associated noise component which extends beyond or above the noise threshold level, and by delaying the composite video signal, the stretched pulses (curve H) serve as noise protection pulses to modify the delayed video signal to remove therefrom the entirety of each noise component, including the component's relatively broad portion which lies within the amplitude region between and defined by the noise threshold level and white level. The noise-free status of the video signal of curve K may best be appreciated by comparing that waveform with its prior art counterpart, namely curve C of FIG. 1. All vestiges of the noise components have been deleted in curve K whereas troublesome leading and trailing portions of components 16 and 17 remain in waveform C and result in the deleterious effects described hereinbefore.

Of course, there are a variety of ways in which the noise protection pulses of curve H may be utilized to modify the video signal of curve J to produce that of curve K. A cancellation or neutralization process is not essential. For example, the curve H signal may be employed as a switching or selecting signal to operate an electronic switch having one input coupled to the output of delay network 71, another input connected to a source of DC potential, and an output connected to base 81 of transistor 82. The switch, under the control of the switching signal, could alternately apply to base 81 the curve J video signal and the fixed DC potential to produce a signal at base 81 having the same waveform of that shown by curve K.

Since the curve K video signal is totally devoid of noise contamination both above and below the noise threshold level, employing it as the basis from which the sync components 12 are derived will result in an output signal from sync separator 89 containing only true sync pulses. The separator responds to the video signal of curve K, after it is phase inverted in transistor 82, and separates therefrom only those pulses having a peak amplitude exceeding the sync clipping level indicated in waveform K. As a consequence, only the two sync pulses 12 shown in curve L are produced at the output of separator 89. By comparing the curve L signal with its prior art counterpart (waveform D), it is made crystal clear that the immunity of the sync separation process obtained by applicant's invention is materially greater than that obtained heretofore. Since applicant's noise elimination circuit guarantees that no noise components whatsoever will ever reach the input of the sync separator, the operations of the sweep systems will remain in synchronism with the sync components of the received television signal. While there is no horizontal sync pulse during retrace interval Z, the horizontal sweep system will be unaffected due to the action of the automatic frequency control circuitry customarily employed in such a sweep system.

Since the sync separator would respond to only that portion of a noise pulse extending beyond the sync clipping level, the sync separating function may be made noise immune merely by making each noise protection pulse, applied to circuit junction 79, only slightly wider than the width of its associated noise component as measured at the sync clipping level. While the entirety of each noise component would not be eliminated from the composite video signal, the portions remaining would not extend to or reach the sync clipping level and therefore would not deleteriously affect the operation of the sync separator. The sync clipping level of a conventional sync separator will usually wander under dense impulse noise conditions. For that reason, it is preferred that the noise protection pulses be considerably wider than the widths of their corresponding noise pulses at the nominal sync clipping level.

While the invention has been illustrated in connection with a composite video signal representing a television program transmitted in black and white, it is to be understood that the invention is obviously applicable to a color television receiver. It is to noted that a color video signal, in accordance with transmission standards existing in the United States, includes components throughout the entire amplitude range between sync tip and white levels. Some color signals, particularly the color sync components each of which occurs during a retrace interval immediately following the sync pulse, will occupy the region between the sync tip and blanking levels. The makeup or composition of the composite color video signal will be of no concern, however, and the levels shown in waveform A will remain in the positions indicated. In order to render the sync separator unresponsive to the color signals exceeding the sync clipping level, a low-pass filter is normally included in the input of the separator to effectively eliminate all color components inasmuch as they will exhibit relatively high frequencies.

Immunization of the sync separation process against the effects of noise may also be attained without necessarily deleting the noise components from the composite video signal before it is delivered to the input of the separator. In accordance with one aspect of the invention, the noise-contaminated video signal of curve A, or its noise-clipped version of curve F, may be supplied via a delay line to the separator and the noise protection pulses of curve H (or alternatively protection pulses only slightly wider than the noise components as measured at the sync clipping level) may then function as noise gating pulses to disable the separator during their occurrences. A variety of noise-gated separators are available which, in response to applied gating pulses, are turned OFF in order to be unresponsive to an applied video signal. The pulses of curve L would be developed, from the delayed video signal, in a separator which is noise gated by the H-pulses.

In accordance with still another facet of the invention, the noise protection pulses of curve H may be utilized to noise gate the automatic gain control system of a television system to prevent false operation of that system otherwise resulting when the instantaneous amplitude of a noise component lies, during a retrace interval, between the AGC reference level and the noise threshold level, as is the case during retrace Z. More specifically, this is realized in the illustrated embodiment by supplying the video signal of curve J to the base 94 of a normally cutoff PNP-transistor 95 which functions as an AGC gate or gated amplifier. A reverse bias is applied to base 94 by means of positive DC voltage source 92 and resistor 93. Emitter 96 is connected via a resistor 97 to a positive source of DC operation potential 98 and it is also connected to the collector 101 of a normally cutoff NPN-transistor 102 (serving as a noise gate) the emitter 103 of which is grounded while its base 104 is coupled through a capacitor 107 to the emitter 65 of transistor 64 to receive the pulses of curve H. Base 104 is returned to ground through a resistor 109. Collector 111 of transistor 95 is coupled to the anode terminal of an isolating diode 112, the cathode terminal of which is coupled via the clamp capacitor 114 and series-connected resistor 115 to the horizontal output transformer of the horizontal sweep system in order to receive negative-going horizontal retrace or flyback voltage pulses. Circuit junction 113, between diode 112 and capacitor 114, is coupled through an AGC filter, comprising resistor 117 and capacitor 118, to the base 119 of an NPN-transistor 120 the collector 121 being directly connected to a positive source of DC operating potential 122 and the emitter 123 being connected via a resistor 124 to ground. Transistor 120 and its associated elements form an emitter follower and constitute a class A operated current amplifier.

During each retrace interval, in which no noise is present, AGC gate 95 is enabled by means of a retrace pulse applied to collector 111. DC source 92 and resistor 93 establish a threshold bias so that, even though transistor 95 is enabled, it will not conduct unless the peak amplitude of the composite video signal (curve J) applied to base 94 reaches the threshold set by the biasing arrangement, and that threshold will be equal to the AGC reference level indicated in waveform J. The collector current of transistor 95 controls the charge condition of clamp capacitor 114 which in turn controls the magnitude of an AGC voltage developed at emitter 123.

In more detail, during each of retraces X and Y a negative-going retrace voltage pulse from the horizontal output transformer is applied via resistor 115, clamp capacitor 114 and diode 112 to the collector 111 to enable or key transistor 95 into readiness for operation. Since the peak amplitudes of sync components 12 reach the AGC reference level, transistor 95 conducts during the occurrence of each sync pulse. The collector current flows in the direction from collector 111 and through diode 112 to clamp capacitor 114 to maintain that capacitor charged, with the indicated polarity, to the potential level required to maintain a constant gain. During intervening trace intervals clamp capacitor 114 discharges slightly through the AGC filter 117, 118. Curve M illustrates the current waveform of the collector current of transistor 95. Only small amplitude current pulses 26 manifest in curve M during retraces X and Y as that is all that is necessary to replenish the charge lost during the trace intervals. Diode 112 prevents capacitor 114 from discharging through transistor 95 during the trace intervals.

The positive voltage appearing at the output of the AGC filter, which functions to smooth out the voltage variations at junction 113 caused by the charging and discharging of clamp capacitor 114, is applied to base 119 to produce a directly proportional positive voltage, but slightly less in amplitude, at emitter 123 which constitutes the automatic gain control voltage of the AGC system. That voltage is applied to the RF tuner and IF amplifier to adjust their gains inversely with received signal strength variations.

If the television signal picked up by antenna 31 increases in strength, the peak amplitude of the sync components 12 of the curve J video signal will become less positive relative to the positive bias voltage, or AGC reference voltage, applied to base 94. As a consequence, increased collector current will be translated through transistor 95 to clamp capacitor 114 to increase its charge which in turn increases the magnitude of the AGC voltage applied to the tuner and IF amplifying channel to effect a gain reduction. If desired, the AGC voltage may be supplied directly to one or more stages of the IF channel but through an AGC delay circuit to the RF tuner so that gain reduction of the RF amplifier in the tuner occurs only when the received signal strength exceeds a predetermined level. Until that level is reached, the RF amplifier operates at full or maximum gain.

Decreased signal strength, on the other hand, results in the sync components applied to base 94 having a peak amplitude more positive than the threshold of AGC gate 95. As a result, even though the gate may be enabled by a flyback pulse during each retrace interval, no collector current will flow to capacitor 114 and it will discharge continually, causing the magnitude of the AGC voltage to decrease and effect a gain increase in the receiver until the desired peak-to-peak amplitude of the output signal of video detector 33 is reached.

In short, there is disclosed an automatic gain control voltage generator, having a normally cutoff AGC gate 95 enabled during each retrace interval and threshold biased to sample each sync component whose peak amplitude reaches the AGC reference level, for developing from such samplings an automatic gain control voltage the magnitude of which represents the strength of the received television signal. Circuitry within block 30 responds to that AGC voltage to regulate the gain of the receiver inversely with received signal strength variations to maintain a substantially constant peak-to-peak amplitude of the video and sync components and to maintain a fixed relationship between the peak amplitude of the sync components and the AGC reference level.

Normally cutoff noise gate 102 constitutes disabling means which, in response to each noise protection pulse of curve H, disables AGC gate 95 thereby to prevent sampling of any noise component whose instantaneous amplitude lies, during a retrace interval, between the AGC reference level and the noise threshold level.

To elucidate, each H-pulse forward-biases transistor 102 to the extent necessary to establish collector 101 and consequently emitter 96 at a positive voltage too low to permit any conduction in transistor 95. The AGC gate thus will not be able to respond to its input signal on base 94 so long as noise gate 102 conducts. This means that transistor 95 will not be permitted to sample noise component 17 during retrace Z which would otherwise cause the translation of a substantial amount of charging current to clamp capacitor 114 with a resultant sharp reduction in gain. The absence of any current pulse supplied to capacitor 114 during retrace Z is reflected in waveform M. Compare that waveform with curve E of FIG. 1 containing during retrace Z the large amplitude current pulse 27 which would thoroughly disrupt the AGC system. As explained previously in connection with the prior art, high-amplitude charging current will be translated to the clamp capacitor any time the instantaneous amplitude of the leading and/or trailing edge of a noise component exceeds the AGC reference level during a retrace interval but, in the case of the leading edge, has not yet crossed the noise threshold level, or in the case of the trailing edge has already crossed the noise threshold level but has not yet crossed the AGC reference level. With applicant's invention, however, this will never happen as the noise gating pulses are broad enough to disable the AGC system prior to the start of a noise component and to maintain it disabled until after the conclusion of the noise pulse.

Inasmuch as AGC gate 95 would respond only to the portion of a noise component extending beyond the AGC reference level, each noise protection pulse applied to noise gate 102 need be only slightly wider than its corresponding noise component as measured at the AGC reference level.

To summarize the invention very briefly, applicant has essentially provided a control arrangement or means for producing in response to each noise component in the composite video signal a noise protection pulse of a duration at least greater than the width of the associated noise component as measured at the noise threshold level. Immunizing means respond to the noise protection pulses to minimize deleterious effects of the noise components on the operation of the television receiver.

While a particular embodiment of the invention has been shown and described, modifications may be made, and it is intended in the appended claims to cover all such modifications as may fall within the true spirit and scope of the invention.

I claim:

1. A noise protection arrangement for a television receiver comprising:

means for deriving, from a received television signal, a composite video signal having desired video and sync components varying within a predetermined amplitude range between and defined by sync tip and white levels, but subject to the introduction of undesired noise components each extending with decreasing width in the direction of said sync components and to a peak amplitude beyond both said sync tip level and a predetermined noise threshold level lying outside of said range;

control means, including pulse-stretching means, for producing in response to each noise component a noise protection pulse of a duration at least greater than the width of the associated noise component as measured at said noise threshold level;

and immunizing means, including video signal delay means and matrixing means, responsive to said noise protection pulses for minimizing deleterious effects of said noise components on the operation of said television receiver.

2. A noise protection arrangement according to claim 1 in which each of said noise protection pulses has a duration greater than the maximum width of its associated noise component.

3. A noise protection arrangement according to claim 2 in which said immunizing means utilizes each noise protection pulse to modify said composite video signal to delete therefrom the entirety of the associated noise component and develop a resultant composite video signal devoid of any noise contamination both above and below said noise threshold level.

4. A noise protection arrangement according to claim 1 and including a sync separator for separating said sync components from said composite video signal, and in which said immunizing means utilizes said noise protection pulses to effectively render said sync separator immune to said noise components.

5. A noise protection arrangement according to claim 1 and including an automatic gain control system for regulating the gain of said receiver inversely with signal strength variations of the received television signal, and in which said immunizing means utilizes said noise protection pulses to effectively render said automatic gain control system immune to said noise components.

6. A noise protection arrangement according to claim 2 in which said immunizing means includes noise removal means responsive to each noise protection pulse for removing from said composite video signal the entirety of the associated noise component, including the component's relatively broad portion which lies within the amplitude region between and defined by said noise threshold level and said white level, said noise removal means establishing said composite video signal at a fixed desired amplitude level throughout the entire duration of each noise component.

7. A noise protection arrangement according to claim 2 in which said control means includes an amplitude-sensitive noise separator for producing, in response to the relatively narrow portion of each noise component which extends beyond said noise threshold level, a noise control pulse of a duration equal to the width of the associated noise component as measured at said noise threshold level, and in which each of said noise protection pulses is produced from a different respective one of said control pulses.

8. A noise protection arrangement according to claim 7 in which said control means includes a wave-shaping circuit for stretching each of said noise control pulses to form said noise protection pulses.

9. A noise protection arrangement according to claim 2 in which said immunizing means includes a delay network for delaying said composite video signal in order that each noise protection pulse overlaps the leading and trailing edges of its associated noise component in the delayed video signal.

10. A noise protection arrangement according to claim 9 in which said immunizing means includes a matrix circuit for effectively subtracting said noise protection pulses from the delayed video signal.

11. A noise protection arrangement according to claim 10 in which said matrix circuit includes an impedance to one terminal of which is supplied the delayed video signal with its noise components being of one polarity, and to the other terminal of which is supplied said noise protection pulses with opposite polarity, said resultant composite video signal being derived from said other terminal.

12. A noise protection arrangement according to claim 1 and including a sync separator for separating said sync components from said composite video signal, and in which said immunizing means employs said noise protection pulses as cancellation pulses to neutralize said noise components and render them ineffective with respect to the operation of said sync separator.

13. A noise protection arrangement according to claim 1 and including a sync separator, threshold-biased to respond to said composite video signal when its instantaneous amplitude reaches a predetermined sync clipping level, for separating said sync components from said composite video signal; in which each of said noise protection pulses has a duration at least greater than the width of its associated noise component as measured at said sync clipping level; and in which said immunizing means utilizes the noise protection pulses to effectively render said sync separator immune to said noise components.

14. A noise protection arrangement according to claim 2 in which said video components occur during spaced-apart trace intervals of said composite video signal and said sync components occur during intervening retrace intervals, and including a keyed automatic gain control system for regulating the gain of said receiver in accordance with the peak amplitude of each of said sync components, and in which said immunizing means includes disabling means responsive to said noise protection pulses for disabling said automatic gain control system throughout the entire duration of each noise component, thereby to prevent false operation of said gain control system otherwise resulting in response to said noise components.

15. A noise protection arrangement according to claim 14 in which said automatic gain control system includes a voltage generator, having a normally cutoff AGC gate enabled during each retrace interval and threshold biased to sample each sync component whose peak amplitude reaches a predetermined AGC reference level, for developing from such samplings an automatic gain control voltage the magnitude of which represents the strength of said received television signal, and means responsive to said automatic gain control voltage for regulating the gain of said receiver inversely with received signal strength variations to maintain a substantially constant peak-to-peak amplitude of said video and sync components and to maintain a fixed relationship between the peak amplitude of said sync components and said AGC reference level, and wherein said disabling means includes a noise gate which, in response to each protection pulse, disables said AGC gate thereby to prevent sampling of any noise component whose instantaneous amplitude lies, during a retrace interval, between said AGC reference level and said noise threshold level.

* * * * *